Feb. 23, 1926.                                                    1,574,554
A. CHLPKA
DIMMER SHADE FOR MOTOR VEHICLE HEADLIGHTS
Filed August 27, 1925          2 Sheets-Sheet 2
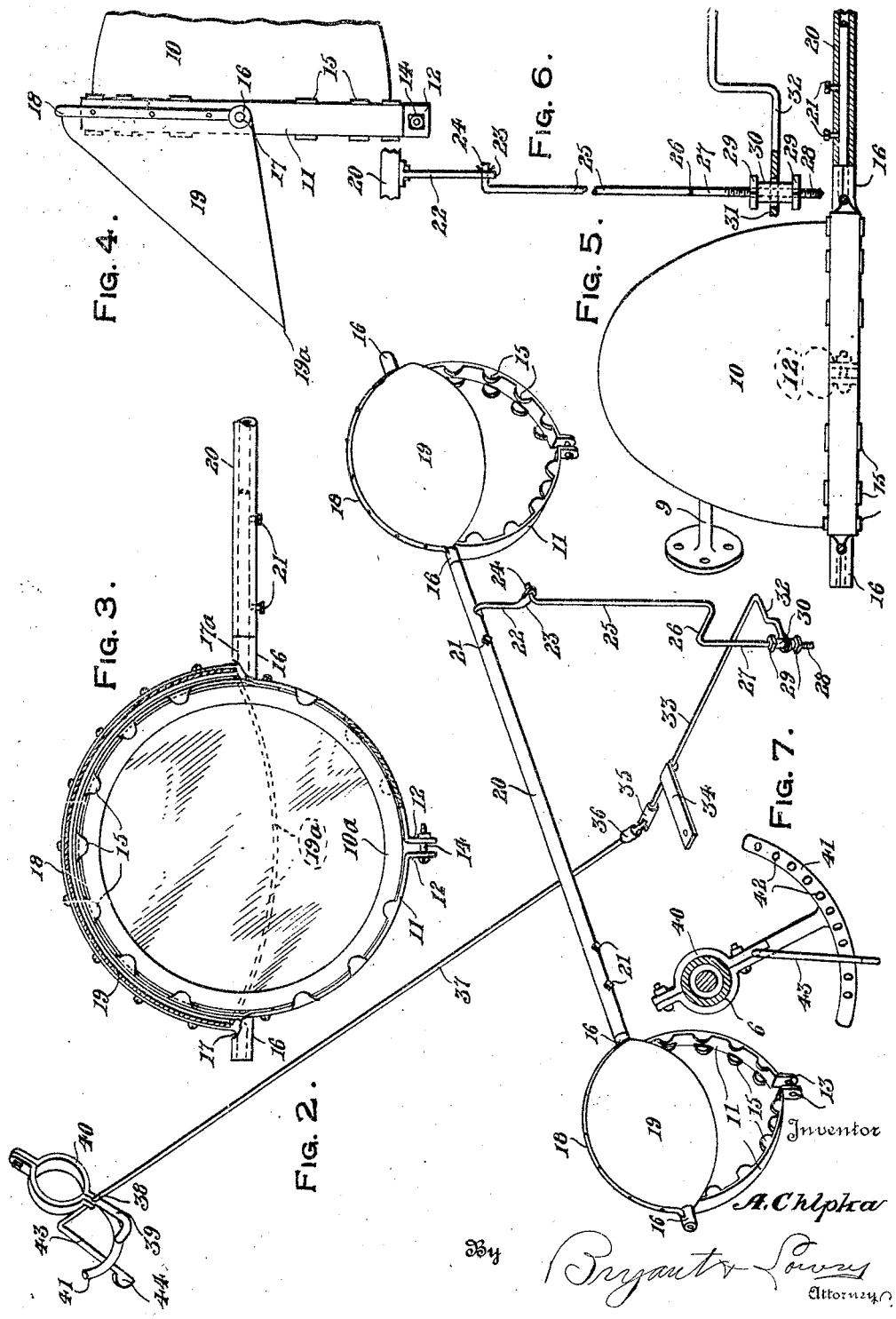

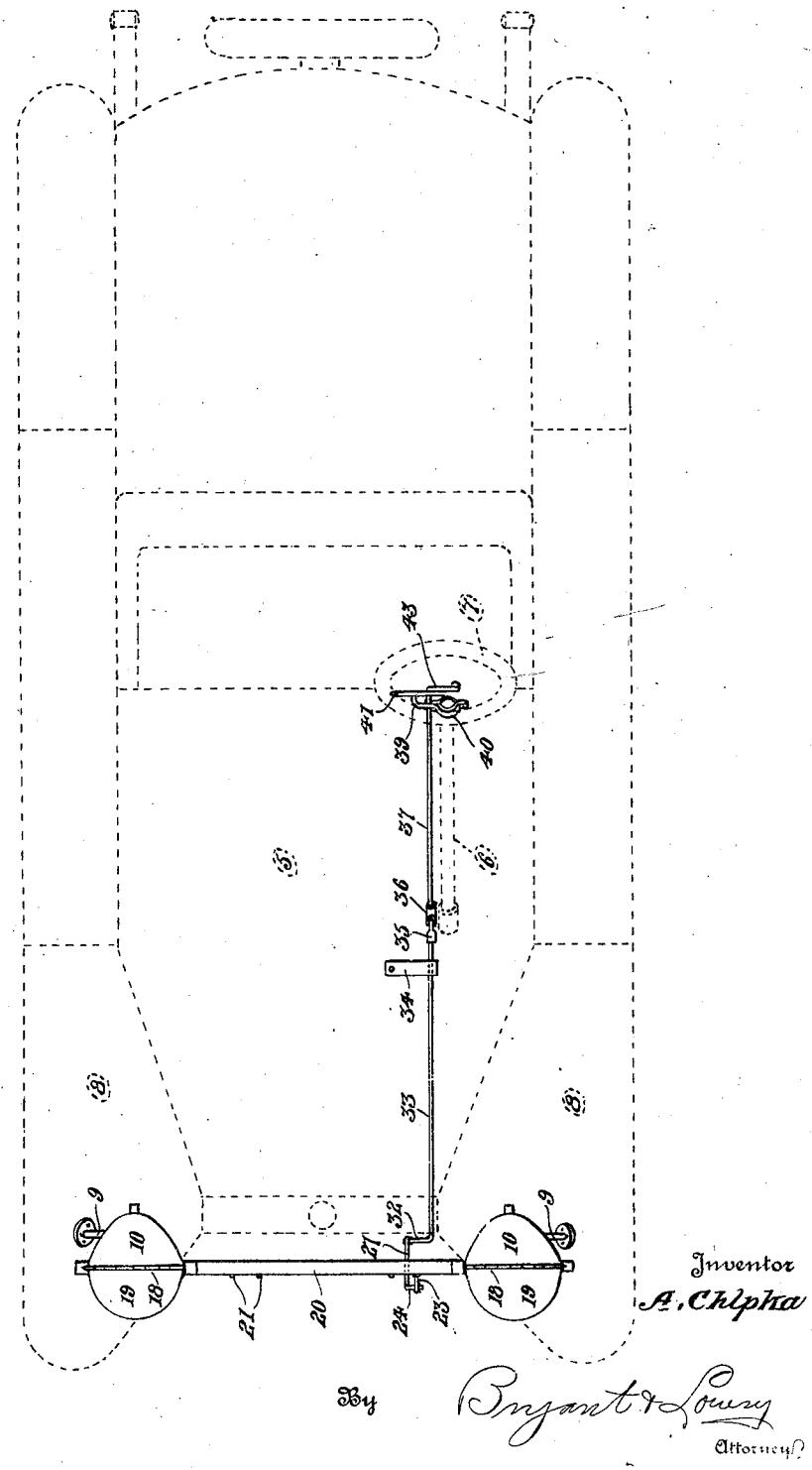

Patented Feb. 23, 1926.

1,574,554

UNITED STATES PATENT OFFICE.

ANDREW CHLPKA, OF LACKAWANNA, NEW YORK.

DIMMER SHADE FOR MOTOR-VEHICLE HEADLIGHTS.

Application filed August 27, 1925. Serial No. 52,905.

*To all whom it may concern:*

Be it known that I, ANDREW CHLPKA, a citizen of the United States of America, residing at Lackawanna, in the county of Erie and State of New York, have invented certain new and useful Improvements in Dimmer Shades for Motor-Vehicle Headlights, of which the following is a specification.

This invention relates to new and useful improvements in dimmer shades for motor vehicle headlights.

The primary object of the invention is to provide a novel form of dimmer shade for headlights, and a controlling means therefor which will permit the shades being tilted at different angles in respect to the said headlights.

Other objects and advantages of the invention will be apparent during the course of the following description.

In the accompanying drawings forming a part of this specification and in which like numerals are employed to designate like parts throughout the same, Figure 1 is a top plan view of an automobile, shown in dotted lines, and the improved form of dimmer shade and control embodying this invention, shown in full lines, attached to the automobile.

Figure 2 is a perspective view of the dimmer shades embodying this invention with their controlling means, Figure 3 is a fragmentary view of the structure shown in Fig. 1 and being illustrated partly in front elevation and partly in vertical section, Figure 4 is a fragmentary side elevational view of one of the headlights which is equipped with the improved form of dimmer shade embodying this invention, Figure 5 is a top plan view of the structure shown in Fig. 3, Figure 6 is a fragmentary vertical sectional view of a portion of the dimmer shade controlling means illustrated in Fig. 2, and Figure 7 is a fragmentary top plan view of the portion of the controlling means which is to be attached to the steering mechanism of the automobile, shown in Fig. 1.

In the drawings, wherein for the purpose of illustration is shown a preferred embodiment of this invention, the numeral 5 designates an automobile to which the improved form of dimmer shade and control embodying this invention is attached. This automobile includes a steering post 6 having the steering wheel 7 carried by the upper end thereof. The front mud guard 8 of the automobile has suitably fastened thereto, by the brackets 9 the conventional form of headlights 10.

Secured to the front rim 10$^a$ of each headlight 10 is a split band 11 having the ears 12 at the ends of the band which are apertured at 13 for the reception of the clamping bolt and nut 14, best shown in Figs. 3 and 4. Each band 11 is provided with a multiplicity of lugs 15 which are carried by each longitudinal edge thereof and are adapted for fitting against or engaging the opposite faces of the rims 10$^a$ for the purpose of preventing the bands 11 from slipping off of the said lights. Each band 11 has formed thereon and projecting laterally therefrom at diametrically opposite points the bearings 16. The trunnions 17 and 17$^a$ formed on the opposite ends of the semicircularly bent frame 18 are received in the bearings 16, as best illustrated in Fig. 3. This frame 18 has fastened thereto and projecting forwardly thereof a dimmer shade 19 which is of a proper size, when the frame 18 is arranged in vertical alinement with the headlight rim 10$^a$, to depend with its lower forward edge 19$^a$ arranged below the focus of the headlight 10.

The trunnion 17$^a$ for each frame 18 is made of greater length than the trunnion 17 so that its end portion will project axially beyond its supporting bearing 16 to permit the tubular rod or pipe section 20 to be connected thereto and held against rotation in respect thereof by the set screws 21. This tubular rod or pipe section 20 has depending therefrom the arm 22 which is formed with the forwardly extending end portion 23 having an aperture therein for receiving the laterally bent end portion 24 of the vertically extending rod 25. This rod is bent at 26 to extend horizontally for forming the depending end portion 27 which extends in a plane arranged in parallelism to the plane occupied by the rod portion 25. The lower end of this end portion 27 is threaded at 28 for receiving the nuts 29 which are employed for holding the sleeve 30 upon the end 28 of the portion 27 and, it will be seen by inspecting Fig. 6, the nuts 29 act as flanges or stops at the opposite ends of the sleeve 30.

Slidably encircling the sleeve 30 and limited in its relative movement in respect thereto by the nuts 29 is the apertured end 31 of the angular rod end 32 carried by the rod 33. This rod 33 is journaled for rotation in the supporting bracket 34 which is intended to be secured to a suitable portion of the automobile 5. The rear end of this rod 33 has fastened thereto one element 35 of a universal joint which further includes the element 36. This last mentioned element is fastened upon the lower end of the rod 37 which extends upwardly in parallelism with the steering post 6 and is journaled adjacent its upper end, as at 38, in the arm 39 carried by the split clamping ring 40 which is intended to be fastened to the steering post 6 immediately beneath the steering wheel 7. This arm 39 carries a quadrant 41, which is shown in Fig. 7 as having the notches 42 formed in its upper surface. The upper end of the rod 37 is bent at right angles to form the actuating arm 43 which has the enlargement 44 at its extremity.

The operation of the device embodying this invention may be briefly described as follows:—

The normal positions of the dimmer shades 19 are shown in Figs. 1 to 4 inclusive. To tilt these shades so that their outer, lower edges 19ª will be positioned at different angles in respect to the focuses of the headlights 10, the controlling arm 43 should be moved along the quadrant 41 for rotating the rod 37. This rotary movement of the rod 37 will cause the rod 33 to rotate for moving the outer apertured end 31 of the rod arm 32 through an arcuate path which is in a truly vertical plane. This movement of the rod arm 32 will cause the rod 25 to be moved vertically for shifting the arm 22 connected to the upper end thereof and to the tubular rod or pipe section 20. This member 20 will rotate for causing the dimmer shade carrying frames 18 to pivot forwardly or rearwardly, depending upon the direction of rotation of the tubular rod or pipe section 20.

It is to be understood that the form of this invention herewith shown and described is to be taken as a preferred example of the same, and that various changes in the shape, size, and arrangement of parts may be resorted to without departing from the spirit of the invention or the scope of the subjoined claim.

Having thus described the invention, I claim:—

In a device of the type described, the combination with the headlights of a motor vehicle, of a ring clamped on the rim of each headlight, a pair of bearings carried by each ring and projecting laterally from the opposite sides thereof, a semi-circular frame having end trunnions journaled in said bearings of each headlight, a dimmer shade carried by each frame, a tubular rod connecting the inner trunnions of the said frames, a laterally projecting arm carried by said tubular rod, a vertically extending rod pivotally connected to the extremity of said arm, a horizontally extending rotatably mounted rod having a laterally extending arm, a connection between the vertically extending rod and the last mentioned lateral arm whereby rotation of the horizontal rod will cause the vertical arm to move upwardly or downwardly to rotate the tubular rod connecting said dimmer shade frames, and means for rotating said horizontal rod.

In testimony whereof I affix my signature.

ANDREW CHLPKA.